(No Model.)
F. O. PIERSON.
AUTOMATIC PRESSURE REGULATING VALVE.
No. 583,546. Patented June 1, 1897.
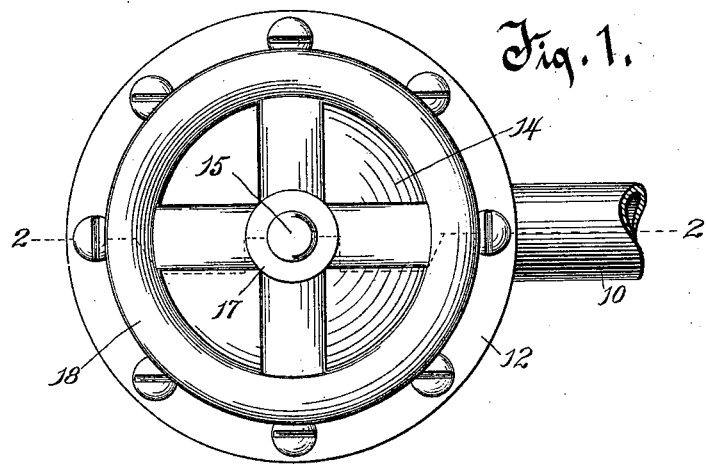
Fig. 1.
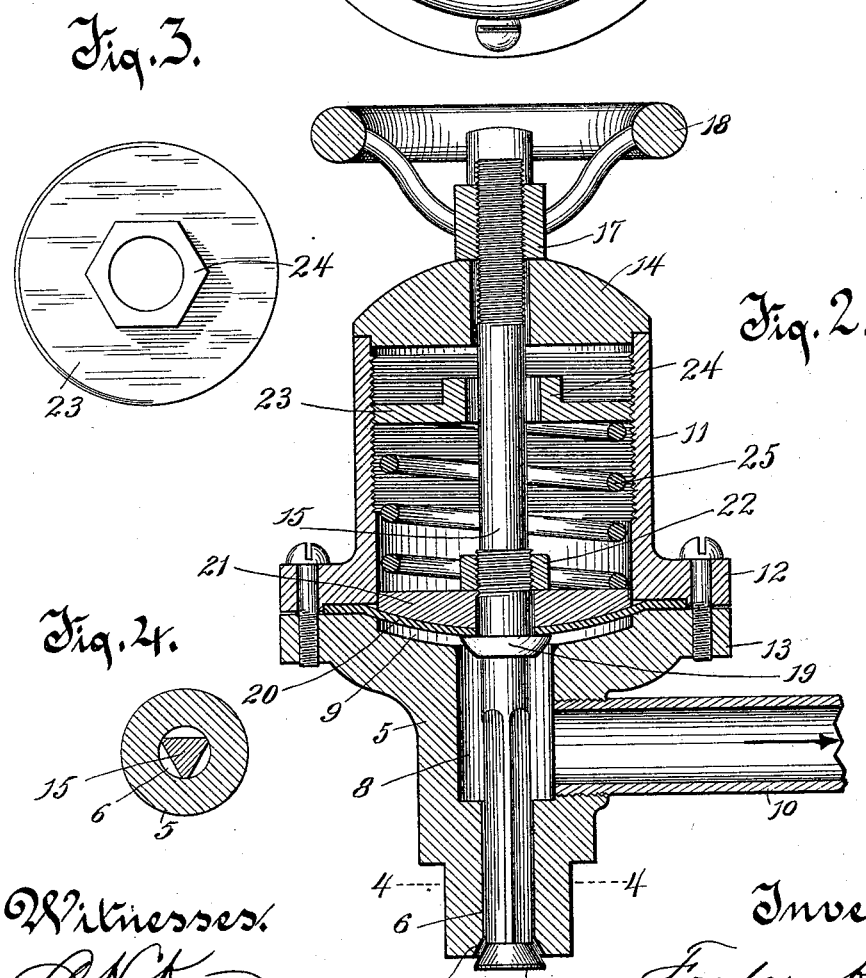
Fig. 2.
Fig. 3.
Fig. 4.
Witnesses:
Inventor:
Frederick O. Pierson.
By Benedict & Morsell
Attorneys.
THE NORRIS PETERS CO., PHOTO-LITHO., WASHINGTON, D. C.

UNITED STATES PATENT OFFICE.

FREDERICK O. PIERSON, OF OSHKOSH, WISCONSIN.

AUTOMATIC PRESSURE-REGULATING VALVE.

SPECIFICATION forming part of Letters Patent No. 583,546, dated June 1, 1897.

Application filed May 1, 1895. Renewed February 17, 1897. Serial No. 623,899. (No model.)

*To all whom it may concern:*

Be it known that I, FREDERICK O. PIERSON, of Oshkosh, in the county of Winnebago and State of Wisconsin, have invented a new and useful Improvement in Automatic Pressure-Regulating Valves, of which the following is a description, reference being had to the accompanying drawings, which are a part of this specification.

My invention has relation to improvements in automatic pressure-regulating valves.

The device is adapted to be worked under pressure of ammonia-gas, steam, air, or water, or, in fact, under any kind of pressure; and it has for its object to provide an improved construction whereby the device can be readily adjusted so that the slightest variation in the pressure may be compensated for.

The invention can be used to advantage especially in connection with apparatuses for condensing ammonia in refrigerating-machines; and it consists of the devices and parts, or their equivalents, as hereinafter more fully set forth.

In the accompanying drawings, Figure 1 is a plan view of the device. Fig. 2 is a longitudinal sectional view on the line 2 2 of Fig. 1. Fig. 3 is a plan view of the inner adjusting-nut, and Fig. 4 is a cross-section on the line 4 4 of Fig. 2.

Like numerals of reference denote like parts throughout the several views.

Referring to the drawings, the numeral 5 indicates the lower portion of a valve-casing, which is provided with an inlet-opening 6, having at its outer end a conical valve-seat 7 and its upper end enlarged to form a chamber 8, said chamber communicating with a recess 9. An opening leads from the chamber 8, and connected up to this opening is an outlet-pipe 10.

The upper portion of the casing is indicated by the numeral 11, the lower end thereof provided with an annular flange 12, which is adapted to be bolted to a corresponding flange 13 of the lower section of the casing. The upper end of section 11 is closed by means of a removable cap-piece 14, which is apertured centrally for the passage therethrough of a valve-stem 15, said stem carrying at its lower end a conical valve 16, which is adapted to regulate the inlet-opening. The upper end of the stem is threaded to receive the central nut portion 17 of the hand-wheel 18, said nut portion bearing against the top of the cap.

Medially the valve-stem carries an annular flange or collar 19, on which rests a diaphragm 20, composed of rubber, sheet metal, or any other desirable material. The outer edge of this diaphragm is clamped or confined between the annular flanges 12 and 13. Bearing against the top of the diaphragm is a block 21, the under side of which is convex. A jam-nut 22 turns on a threaded portion of the stem against the block and holds the same in firm engagement with the diaphragm.

The interior of the upper portion 11 of the casing is threaded, and engaging these threads is an interior nut 23, preferably provided with a hexagonal head 24 to provide for conveniently applying a turning-tool thereto. The nut is provided centrally with an opening through which the valve-stem passes freely. Beneath this nut and confined between the same and the block 21 is a coiled spring 25.

In the operation of my device the adjusting-nut is first turned to give the coiled spring the requisite tension to overcome a predetermined pressure and hold the valve 16 away from the valve-opening, so as to admit the pressure fluid into the inlet. It will be noticed that the lower end of the valve-stem (see Fig. 4) is triangular in cross-section to form a series of longitudinal recesses, so that the pressure fluid or gas is free to pass into the chamber 8, and from this chamber into the outlet-pipe 10. It will be understood, of course, that in order to secure access to the adjusting-nut 23 it is first necessary to remove the hand-wheel 18 and then take off the cap-piece 14. After the proper adjustment is secured these parts can be readily set in place again. If the pressure in the outlet-pipe 10 should increase beyond the point for which the adjusting-nut was set, this surplus pressure will act against the under surface of the diaphragm 20, and thereby raise said diaphragm against the tension of the coiled spring 25. The diaphragm of course raises the valve-stem and causes the valve 16 to approach its valve-seat, thereby limiting the extent of the valve-opening, and consequently decreasing the amount of the pressure fluid or air entering the valve-casing and to that extent decreasing the pressure and restoring the normal pressure. It will thus be seen that said normal pressure will always be maintained by this automatic adjustment.

In the art of ice-making or refrigerating it requires very close attention to the gage in order to keep a uniform pressure, and if there is the least variation in the pressure the valve ordinarily used has to be closed or opened, as may be required.

In applying my improved device in connection with an apparatus for condensing ammonia in a refrigerating-machine the outlet-pipe 10 is connected to the evaporating-coil of such apparatus, while the inlet end of the valve-casing is screwed into or otherwise connected to the liquid-receiver thereof. The pressure in said evaporating-coil is kept at from fifteen to twenty pounds to the square inch, and it is very essential to keep it as near that point as possible. By the use of my improved valve it is obvious that the desired pressure can be maintained in a most simple manner, as hereinbefore fully pointed out.

When there is no pressure and it is desired to retain the valve in place against its seat or when it is desired to stop the machine entirely, the hand-wheel is turned so as to raise the valve-stem and its valve, and thereby close the valve-opening. This method of closing the valve-opening and retaining the valve against its seat will be found particularly advantageous when using my improved valve-regulating mechanism in connection with an apparatus for condensing ammonia in refrigerating-machines. When thus used, the ammonia-gas which is in the refrigerating-coil of said apparatus will under such circumstances ascend and pass through the headers to the compressor and will be evaporated, so that when the operation is resumed there is no gas left in the machine. In other forms of apparatus where gas is left in the machine the temperature at restarting is necessarily very high.

Having thus described my invention, what I claim, and desire to secure by Letters Patent, is—

1. In automatic pressure-regulating valves, the combination, of a casing provided with an inlet and an outlet opening, a valve-stem extending longitudinally of the casing, said stem carrying at one end a valve for regulating the inlet-opening, and having its opposite end threaded and passing freely through an opening in the end of the casing opposite to the inlet-opening end, a nut engaging said threaded end of the valve-stem, a diaphragm mounted on the valve-stem, mechanism acting against the diaphragm, and an adjusting device for the mechanism which acts against the diaphragm, said adjusting device adapted to be so regulated that, when the pressure against the diaphragm exceeds a certain normal pressure, said diaphragm will actuate the valve-stem, and cause its valve to close the inlet-opening, substantially as described.

2. In automatic pressure-regulating valves, the combination, of a casing provided with an inlet and an outlet opening, a removable apertured cap for the upper end thereof, a valve-stem provided at one end with a valve for regulating the inlet-opening, and having its opposite end threaded and passing through the aperture of the cap, a hand-wheel having a central nut portion engaging the threaded end of the valve-stem and bearing against the cap, a diaphragm mounted on the valve-stem, mechanism acting against the diaphragm, and an adjusting device for the mechanism which acts against the diaphragm, said adjusting device adapted to be so regulated that, when the pressure against the diaphragm exceeds a certain normal pressure, said diaphragm will actuate the valve-stem, and cause its valve to close the inlet-opening, substantially as set forth.

In testimony whereof I affix my signature in presence of two witnesses.

FREDERICK O. PIERSON.

Witnesses:
GEORGE HILTON,
GEORGE SIMMONS.